UNITED STATES PATENT OFFICE.

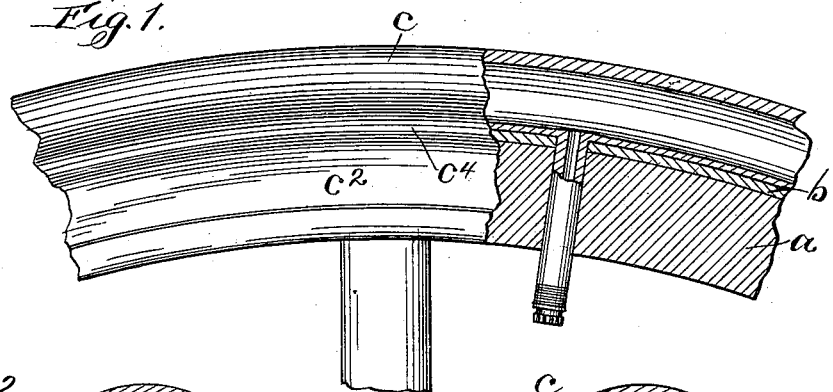
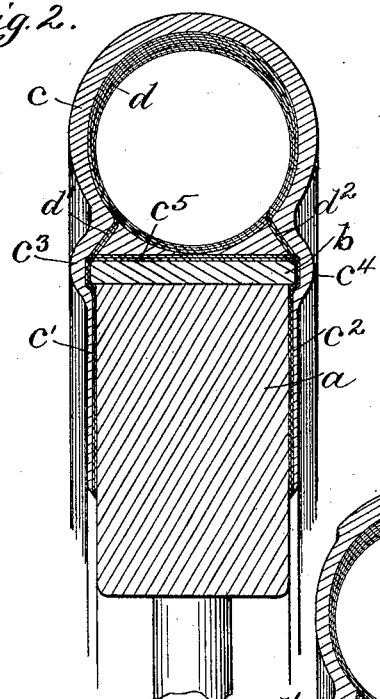
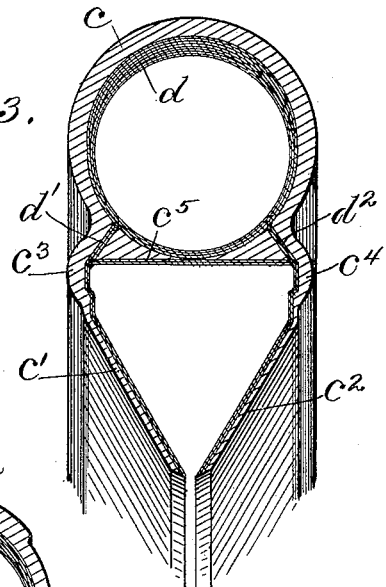
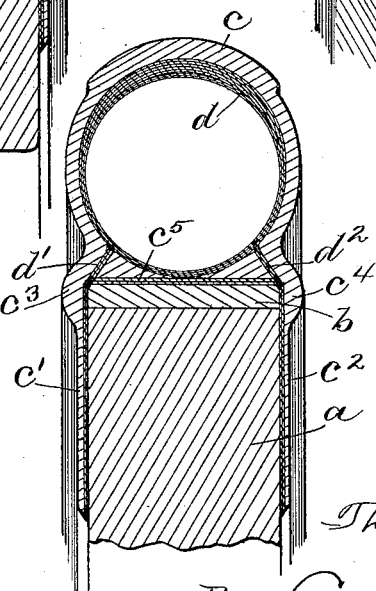

THOMAS W. MORRIS, OF CHICAGO, ILLINOIS.

PNEUMATIC TIRE FOR VEHICLES.

SPECIFICATION forming part of Letters Patent No. 600,162, dated March 8, 1898.

Application filed April 14, 1897. Serial No. 632,162. (No model.)

*To all whom it may concern:*

Be it known that I, THOMAS W. MORRIS, a citizen of the United States, residing at Chicago, in the county of Cook and State of Illinois, have invented a certain new and useful Improvement in Pneumatic Carriage-Tires, of which the following is a full, clear, concise, and exact description, reference being had to the accompanying drawings, forming a part of this specification.

My invention relates to a pneumatic tire for vehicles, my object being more particularly to provide a tire that may be applied to vehicle-wheels having a felly with a rectangular periphery, the construction being such that the tire may be readily applied to the wheels of vehicles already in use having surrounding steel tires.

In accordance with my invention a rubber pneumatic tire is provided which carries on the inner periphery a solid clasping portion of rubber having a flat seat and flat flanges extending inwardly therefrom and adapted to be cemented or otherwise secured to the opposite sides of the rectangular felly, while at the intersections of the seat and the flanges projecting reinforcing-rings of rubber are provided which extend laterally beyond the respective exterior faces of the flat flanges to reinforce the rubber and to serve as buffers to protect the flat flanges. To reinforce the structure and afford firmness, a number of layers of canvas or similar fabric are provided embedded in the rubber of the tire and surrounding the bore thereof, while the faces of the flanges and the seat of the portion of the tire which clasps the felly are lined with canvas, the corners of the clasping portion of the tire being joined by several layers of canvas with the periphery of the canvas surrounding the bore of the tube. The structure is thus rendered firm to withstand the strains to which it may be subjected.

I have illustrated my invention in the accompanying drawings, in which—

Figure 1 is a view of a section of a wheel, showing the tire of my invention applied thereto, the tire being shown partially in section. Fig. 2 is a transverse sectional view showing the tire applied to the wheel. Fig. 3 is a transverse sectional view showing the tire before being placed upon the wheel. Fig. 4 is a view of a modification.

Like letters refer to like parts in the several figures.

The felly $a$ of the wheel is illustrated as provided with a steel tire $b$, this structure being usually used in ordinary vehicle-wheels. The pneumatic tire comprises a rubber tube $c$, carrying upon the inner face the rubber flanges or rings $c'$ $c^2$, adapted to engage the sides of the felly. Upon the sides of the tire and between the tube and the flanges projecting rings $c^3$ $c^4$ are provided, which afford a considerable bulk at the corners where the tube is subjected to considerable strain and which also serve as buffers to prevent objects against which the side of the wheel rubs from coming in contact with the flanges or rings. The tire is made thickest at the tread, gradually diminishing in thickness toward the felly of the wheel. To reinforce the rubber and impart strength and firmness to the structure as a whole, a number of layers of canvas or other fabric $d$ are embedded in the rubber of the tire and surround the bore thereof. The canvas also lines the inner faces of the flanges $c'$ $c^2$ and also lines the seat $c^5$ of the portion of the tire which rests upon the periphery of the felly. The layers $d'$ $d^2$ of canvas extend from the corners of the rectangular clasping portion of the tire to the periphery of the canvas layers surrounding the bore of the tube, thus preventing the breaking of the tire at the corners thereof, which are subjected to considerable strain.

The tire as thus constructed is puncture-proof and is adapted to be readily applied to wheels having a square felly and may be applied to vehicle-wheels now in use without any change whatever, the clasping portion of the tire being placed over the felly of the wheel, and the flanges serve to hold the tire in position on the wheel even without being cemented thereto, though in practice I preferably cement the inner faces of the flanges to the wheel to prevent any movement of the tire on the wheel.

Having described my invention, what I claim as new, and desire to secure by Letters Patent, is—

As a new article of manufacture, a rubber tire for rectangular vehicle-fellies formed in an integral piece and comprising a pneumatic tube and a solid clasping portion of rubber formed on the inner periphery thereof adapted to clasp the rectangular felly and consisting of a flat seat adapted to rest against the periphery of the felly, and a pair of flat flanges extending inward therefrom the faces of which are adapted to be cemented or otherwise secured to the opposite sides of the felly, the parts of said clasping portion opposite the intersections of the flat seat and the flanges being reinforced by projecting rings or buffers of rubber extending laterally beyond the respective exterior faces of the flanges, substantially as described.

In witness whereof I have hereunto subscribed my name in the presence of two witnesses.

THOMAS W. MORRIS.

Witnesses:
W. CLYDE JONES,
M. R. ROCHFORD.